Aug. 30, 1932.  G. E. BISHOP  1,874,867

AUTOMOBILE SIDE INCLOSURES ADAPTED FOR VENTILATING AND HANDHOLE PURPOSES

Filed Jan. 7, 1930

INVENTOR:
GEORGE E. BISHOP
BY George W. Saywell
ATTORNEY

Patented Aug. 30, 1932

1,874,867

UNITED STATES PATENT OFFICE

GEORGE E. BISHOP, OF CLEVELAND HEIGHTS, OHIO

AUTOMOBILE SIDE INCLOSURES ADAPTED FOR VENTILATING AND HANDHOLE PURPOSES

Application filed January 7, 1930. Serial No. 419,143.

My invention particularly relates to automobile side inclosures which are adapted to be mounted upon an automobile door so as to travel out and in with the latter as it is opened and shut, said inclosure being so constructed that efficient ventilation therethrough may be conveniently obtained, even when the door is shut; and also so constructed that, even without opening the automobile door or the ventilating part of the inclosure, means are provided which permit a convenient passing of the hand through the ventilator opening, for the purposes of traffic signalling, etc.
The annexed drawing and the following description set forth in detail certain means embodying my invention, such means constituting, however, but one of the various forms in which the principle of the invention may be applied.

Figure 1:
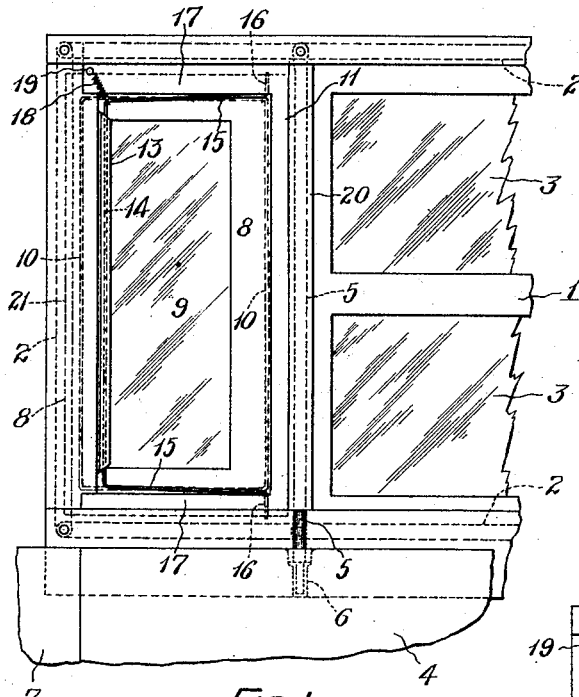
Figure 1 is an inside view of my improved automobile side inclosure, showing only a fragmentary portion of the body thereof but showing the entire ventilator and hand-hole part, the latter being shown in closed position.

Referring to the annexed drawing in which the same parts are indicated by the same respective numbers in the several views, an automobile side inclosure body member 1 is provided with a suitable strengthening frame comprised of the bars 2, and with suitable outlooks 3. This inclosure is of any suitable standard design and is adapted to be mounted upon a door 4 of the automobile 7 through the medium of a vertical supporting rod 5 contained in a pocket 20 formed in the curtain body 1. The rod 5 is secured to top and bottom strengthening members 2, and supported in the bushing 6 mounted in the door frame 4. The elements just described are conventional and may be of any suitable character adapted to accommodate and co-operate with the improved ventilating and hand-hole members which will now be described.

These ventilating and hand-hole members are provided within a panel portion 8 of the body 1, which panel portion is also provided with an outlook 9, if desired, and so here shown. This ventilating panel 8 is strengthened by a rectangular frame 10 comprised of light gauge rod. It might be stated that the inclosure and panel constructions shown and described are presumed to be of fabric body material, so that the metal strengthening members 2 and 10 are provided. The panel 8 is movable relatively to the other portion of the inclosure body 1, and, in the form here shown and described, is hinged to the other portion of the body 1 in the vertical plane 11 so that said panel 8 can be swung outwardly from the body member. There is no necessity for hinging the ventilating panel in a vertical plane but it is here so shown and described for purposes of illustration. However, it is well within the spirit of my invention to hinge one of the other panels of the body member 1, which are provided with the outlooks 3, in a horizontal plane and adapt such a panel to my improved ventilating and hand-hole purposes.

Figure 4:
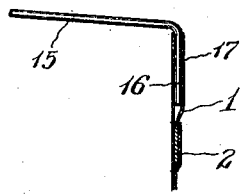
Figure 4 is a vertical section, upon an enlarged scale, taken in the plane indicated by the line 4—4, Figure 2.
Figure 3:
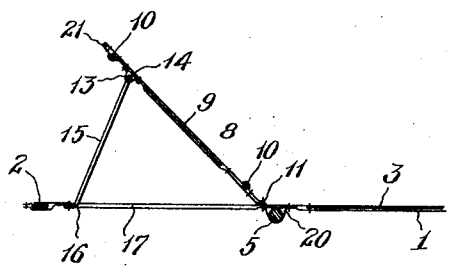
Figure 3 is a horizontal section, taken in the plane indicated by the line 3—3, Figure 2.

In the panel 8 and adjacent its opening edge, I form a vertical pocket 13 and position therein a light gauge rod 14 having extended substantially horizontal end members 15 formed with vertically extended extreme end portions 16. These rod portions 16 are adapted to play in guides formed in the curtain body member 1 so as to direct the opening and closing of the panel 8 and particularly these rod portions 16 are adapted to hold the panel 8 in open position. For this purpose the fabric body member 1, adjacent the top and bottom of the panel 8, is formed with elongated guide-grooves 17, of substantially the depth of the rod end portions 16 and of substantially the length of the top and bottom edges of the ventilating panel 8, as plainly shown in Figures 3 and 4, whereby upon moving the panel 8 outwardly from the position in Figure 1 to the position shown in Figure 2, the rod 14 can turn in the pocket 13 and the rod portions 16 can travel in the fabric grooves 17. This action will result in the end portions 16 of the rod 14 holding the panel 8 in an open ventilating position determined by the distance through which the rod ends 16 have been moved in the guide grooves 17, the ventilating opening produced by this adjustment of the panel 8 being indicated by the number "22".

Figure 2:
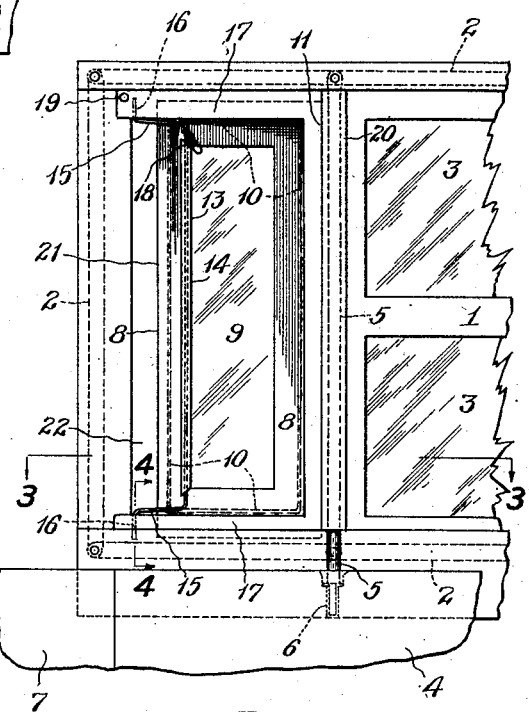
Figure 2 is a view similar to Figure 1, in which the ventilator is shown in open position.

Means are provided for positively holding the panel 8 in closed position. In the form of inclosure which is shown, these fastening means consist of a short section of coil spring 18 which is releasably hooked at one end over a convenient fastening device, such as a pin 19, carried in the body member 1 adjacent the upper end of the opening edge 21 of the panel 8, the other end of this spring section 18 being permanently secured, for instance, to the adjacent corner of the pivotal rod 14. When both ends of the spring section 18 are fastened, the door will be held in closed position, such as shown in Figure 1, and when the one end of the spring section 18 is released from the pin 19, the spring can fall down into the position shown approximately in Figure 2 and the panel 8 can be opened, as shown in Figure 2.

The lower left-hand corner of the panel 8, in the closed position of the latter, makes a tight joint with the body member 1 only by reason of the more or less tensioning effect caused by the spring 18 and the construction of panel which has been shown and described. This tensioning effect, although sufficient to make a satisfactory joint for weatherproof purposes, is not sufficient to interpose any substantial resistance to the passing of the operator's hand by the panel adjacent this lower left-hand corner so as to permit traffic signalling, etc. Thus, the construction of panel serves to permit such convenient signalling, even when the panel is closed, and is not being used for its ventilating purpose. The natural spring of the materials permits this operation without inconvenience or injury or without impairing the closing effect of the panel, when the operator's hand is withdrawn.

What I claim is:

1. An automobile side inclosure comprising a fabric curtain body member provided with a ventilating opening having two substantially parallel edges, a somewhat resilient fabric panel connected to said body member near one of said edges for swinging movement and adapted to close said opening, said panel having a reinforcing frame, and resilient means connecting one end of the swinging edge of said panel to said body member and tending to maintain said panel in its closed position.

2. An automobile inclosure comprising a fabric curtain body member provided with a ventilating opening, a substantially rectangular resilient fabric panel connected at one edge to said body member for swinging movement and adapted to close said opening, releasable means connecting one end of the swinging edge of said panel to an adjacent portion of said body member and adapted to maintain said panel in closed position at said end when the other end of said swinging edge is opened, and means on said body member and panel adapted to maintain the entire swinging edge in open position.

3. An automobile inclosure comprising a curtain body member provided with a ventilating opening and guide grooves at the upper and lower edges of said opening, a substantially rectangular resilient panel connected at a vertical edge to said body member for swinging movement and adapted to close said opening, a coil spring releasably connecting the upper end of the swinging edge of said panel to an adjacent portion of said body member and adapted to maintain the upper part of said panel in closed position when the lower end of the swinging edge is opened by extension of the driver's hand through said opening and by said lower end of the swinging edge, and a rod movably mounted on said panel and adapted to slide in said guide grooves.

Signed by me this 2nd day of January, 1930.

GEORGE E. BISHOP.